(12) United States Patent
Yvon et al.

(10) Patent No.: US 9,046,616 B2
(45) Date of Patent: Jun. 2, 2015

(54) HIGH-ENERGY PHOTON DETECTOR

(75) Inventors: Dominique Franck Marie Yvon, Saint Cyr L'Ecole (FR); Jean Philippe Renault, Massy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 222 days.

(21) Appl. No.: 13/636,445

(22) PCT Filed: Mar. 18, 2011

(86) PCT No.: PCT/EP2011/054153
§ 371 (c)(1),
(2), (4) Date: Nov. 12, 2012

(87) PCT Pub. No.: WO2011/117158
PCT Pub. Date: Sep. 29, 2011

(65) Prior Publication Data
US 2013/0056640 A1     Mar. 7, 2013

(30) Foreign Application Priority Data
Mar. 22, 2010     (FR) ..................................... 10 52047

(51) Int. Cl.
*G01T 1/204*     (2006.01)
*G01T 1/29*      (2006.01)
(52) U.S. Cl.
CPC ............... *G01T 1/204* (2013.01); *G01T 1/2985* (2013.01)

(58) Field of Classification Search
CPC ....... G01T 1/2042; G01T 1/204; H01J 47/028
See application file for complete search history.

(56) References Cited

U.S. PATENT DOCUMENTS 4,262,202 A  *  4/1981  Cusano et al. ................ 250/366
2005/0205796 A1 * 9/2005  Bryman .................... 250/370.11

OTHER PUBLICATIONS

International Search Report dated Apr. 21, 2011.
Amaudruz, et al.; "Simultaneous Reconstruction of Scintillation Light and Ionization Charge Produced by 511 keV Photons in Liquid Xenon: Potential Application to PET", Nuclear Instruments and Methods in Physics Research A, vol. 607, No. 3, Aug. 21, 2009, pp. 668-676.

(Continued)

*Primary Examiner* — Constantine Hannaher
(74) *Attorney, Agent, or Firm* — Pillsbury Winthrop Shaw Pittman LLP

(57) ABSTRACT

A detector of a high-energy photon, the detector including a photodetector and a detection medium that is intended to absorb a high-energy photon while generating ionization electrons and photons along a luminous phenomenon, the electrons and photons being detected by the photodetector. The detection medium is formed of molecules, having a heavy atom with an atomic number greater than or equal to 72, such that the detection medium is liquid under the operating conditions of the detector. The detector also includes a device for diverting the ionization electrons that are generated by the absorbed photon and moreover includes a collector that collects charges in order to determine the time for diverting the electrons to the charge-collector on the basis of a triggering time that corresponds to the detection of the luminous phenomenon by the photodetector.

13 Claims, 1 Drawing Sheet

(56) References Cited

OTHER PUBLICATIONS

Chepel et al.; "Liquid Xenon Multiwire Chamber for Positron Tomography", Nuclear Instruments and Methods in Physics Research A, vol. A367, No. 1, Dec. 11, 1995, pp. 58-61.

Chepel; "A New Liquid Xenon Scintillation Detector for Positron Emission Tomography", International Journal of Radiation Applications and Instrumentation, Part D, Nuclear Tracks and Radiation Measurements, vol. 21, No. 1, Jan. 1, 1993, pp. 47-51.

* cited by examiner

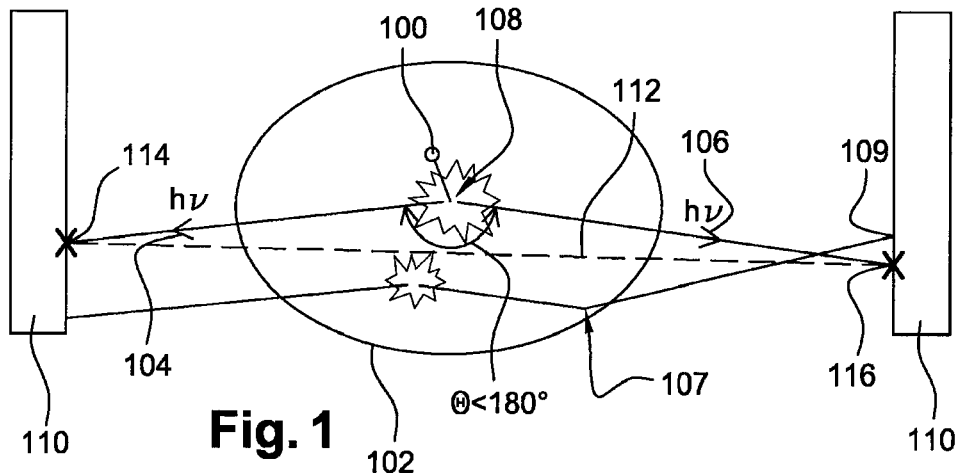
Fig. 1
| | LSO Lu$_2$SiO$_5$:Ce | CdTE | Xénon X liquide | TMBi (CH$_3$)$_3$Bi |
|---|---|---|---|---|
| Longueur d'atténuation | 95% (2,2cm) | 95% (5cm) | 95% (10cm) | 85% (5cm) |
| Rapport photoélectrique | 30% | 15% | 21% | 57% |
| $\tau_{scin}$ | 40ns | Lent (porteurs) | 4 ns | ns |
| Résolution énergie (FWHM) | 15% | 1% | 5% | <10% |
| Localisation des interactions | ~1-0.2 cm Fraction. | 1-5 mm Fraction. | 150 µm | 150µm |
Fig. 2
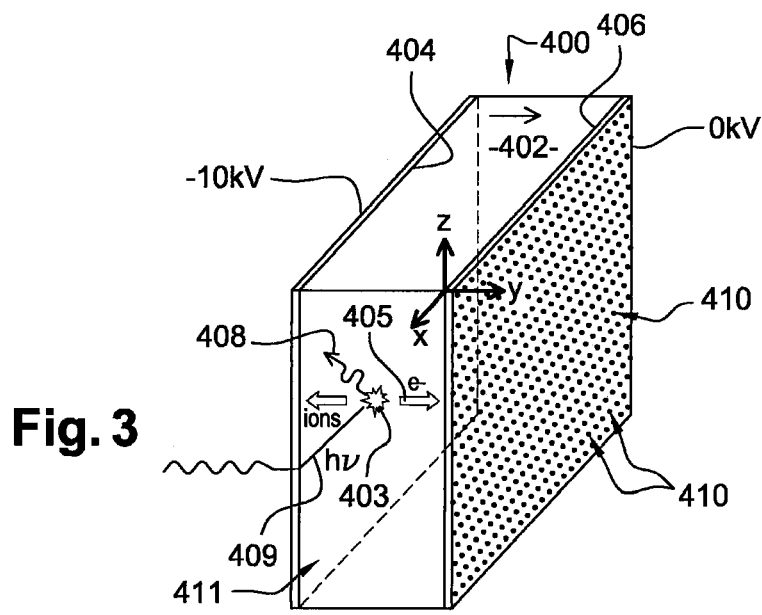
Fig. 3

HIGH-ENERGY PHOTON DETECTOR

CROSS REFERENCE TO RELATED APPLICATIONS

This application is the U.S. National Stage of PCT/EP2011/054153, filed Mar. 18, 2011, which in turn claims priority to French Patent Application No. 1052047, filed Mar. 22, 2010, the contents of all applications are incorporated herein by reference in their entireties.

The invention mainly refers to a detector of high-energy photons, typically greater than 0.5 MeV. Such a detector may be used, for example, in positron emission tomography (PET), for clinical or biological applications, in nuclear physics research and, more generally in measuring photon energy.

PET is a major application in detecting high-energy photons, i.e., greater than 0.5 MeV, for example in the fields of medicine and pharmaceuticals where it enables, in particular, images relative to in vivo biological organs or tissues, particularly inside a human or animal organism, to be obtained.

In the same manner as for other nuclear medicine examinations, performing a PET examination requires injection of a radioactive tracer. A tracer is constituted of a molecular vector and a radioactive isotope that enables the distribution of the molecule within the organism to be located. The choice of an isotope is determined on the one hand according to the chemical properties that the possibility of labeling depends on and on the other hand due according to the decay mode that enables external detection of the radiation emitted. For its implementation, one of the advantages of PET compared to other nuclear medicine techniques is that it has a range of chemical elements of biological interest for labeling at its disposition. In fact, it so happens that of the four main constituents of biological systems, three have isotopes that decay by positron emission: carbon 11, nitrogen 13 and oxygen 15.

Its clinical development was obtained thanks to fluorine 18 ($^{18}F$) that is easily integrated into molecules involved in metabolism. Because of this, PET enables such metabolisms to be followed, and in particular, enables areas with high glucose consumption, such as carcinogenic areas, to be detected.

With reference to FIG. 1, PET is therefore based on the emission of a positron 100 in a studied source 102 so that this positron 100 is annihilated—or decays—with an electron by generating two gamma photons 104 and 106, each with an energy of 511 keV, emitted practically collinearly along opposite directions from a decay point 108.

Thanks to a photon detector 110 surrounding the positron source 102, decay point 108 may be determined as supported by the segment 112 connecting the two points 114 and 116 for detecting photons 104 and 106 within the volume of detector 110. Therefore, practically, the patient is injected with a molecule of biological interest such as a sugar (or dopamine, etc.) Labeled by a radioactive product. Cancer cells, which have greater activity than healthy cells, will absorb this special sugar, which is not metabolized by the cells, as a priority. The radioactive marker, often fluorine 18, decays by emitting a positron (electron antiparticle) that is annihilated in turn with an electron from the environment while emitting two gamma photons (with a determined energy of 511 keV) along two opposite directions.

From millions of reconstructions of segments such as segment 112, it is then possible to represent by contrast high photon-emitting areas compared to weak photo-emitting areas that result in, respectively, areas presenting a high concentration of isotopes compared to areas presenting a low concentration of isotopes.

The results required by PET machine clinicians relate to the overall performance of the machine (see below) but also to the precision of the final image. Here it is useful to recall the gamma photon detection mechanism in a PET detector before defining the parameters that lead to this precision being obtained.

When a gamma photon penetrates into a detector, it interacts in several ways with the detection medium. Most often, the gamma photon interacts by the Compton effect and scatters on an electron without performing a total transfer of its energy. Interactions due to the Compton effect are sometimes used but, overall, they are a source of inefficiency. Interactions designated "photoelectric" signal positron decay: This interaction promptly dissipates any energy from the incident photon (511 keV).

One of the important parameters for comparing different detectors is the "photoelectric ratio," i.e., the ratio of the photoelectric cross section over the total cross section. It depends on the medium used in the detector. Another parameter is the distance covered by the gamma photon before interacting with the medium. This distance is expressed in "attenuation length" and it is all the smaller the denser the medium to cross.

The photoelectron that is produced during the photoelectric interaction is generally absorbed over a short distance by the detection medium. It is likely to react with the molecules present within to:
- ionize them and lead to the formation of "ionization electrons,"
- excite them and produce "scintillation photons."

In conventional PET apparatuses, the detection of scintillation photons by a "photodetector" device enables the energy deposited in inorganic scintillation crystals to be calculated and the detection to be timed. The "scintillation yield," defined as the number of scintillation photons produced per MeV of energy deposited, is also an important parameter since for some PET systems it impacts the energy resolution (resolution enabling photons, the energy of which does not correspond to 511 keV characteristic of positron decay to be excluded). This scintillation phenomenon produces photons with a temporal distribution described by an exponential decay time constant $\tau_s$, designated scintillation decay time constant.

The time constant $\tau_s$ of luminous scintillation decay and scintillation yield has a direct impact on "temporal resolution" that may be defined as uncertainty on the time of detection of an interaction by the detector. It's an important parameter since it determines the duration of the time window that allows a detector to associate two detections of scintillation photons from the decay of a positron ("coincidence phenomenon").

In certain prototype detectors (liquid xenon, CdTe), the "ionization electrons" are collected on a charge collecting plane, so as to be able to do geometric referencing and/or measure the energy collected, depending on the case.

The results required by clinicians do not only relate to the precision of the final image but also to the effectiveness (i.e., percentage of positron decays detected), an increase in which has the reduction in irradiation of patients and health care personnel as a N direct consequence. Current PET machines have an effectiveness that rarely exceeds 1 to 2%. This level is very low since the majority of gamma photons emitted by the positron undergo the Compton effect, either in the studied organism (variable efficacy between 1% to 9%) or in the detection medium (efficacy usually less than 30%). Improvement in the efficacy of the "detector" part of the PET machine is one of the ways enabling the overall yield of a PET machine to be increased.

Considering its operation, a PET detector is intrinsically dependent on three resolutions:
  A spatial resolution of determinations carried out (reconstructions of segments such as segment 112), this spatial resolution being limited by a distance on the order of 0.8 mm-1.5 mm that, statistically, a positron covers before being annihilated by an electron (this value depends on the marker isotope used; it is, for example, 1 mm for fluorine 18, 1.1 mm for carbon 11, 1.4 mm for nitrogen 13 and 1.5 mm for oxygen 15);
  A temporal resolution (defined above) that is typically on the order of a few nanoseconds.
  An energy resolution that enables photons whose energy does not correspond to the 511 keV characteristic of positron decay to be excluded. Typically, such photons to exclude are for example generated by the Compton effect that is produced when a photon 107 scatters on the source 102 without performing a total transfer of its energy such that the same photon 107 generates a false subsequent detection 109 as regards the trajectory of the photon thus deviated.

The table from FIG. 2 illustrates different physical parameters of PET detectors according to the different media used for detection.

It should be emphasized that the majority of detectors 110 used in PET are based on the use of crystal-based inorganic scintillators (such as BGO of formula $Bi_3Ge_4O12$, or LSO of formula $Lu_2SiO_5$:Ce) coupled with a photodetection device such as a photomultiplier or avalanche photodiode ADP, and perhaps soon with multi-pixel photon counters (MPPC) that are part of the "semiconductor photomultiplier" family. These crystals are particularly characterized by a high density so as to increase the chances of interaction of the matter with the photon to be absorbed (density, in $g \cdot cm^{-3}$, generally greater than 6). This density allows for low attenuation lengths (typically 95% photoelectric conversion on an active thickness of 2.2 cm for LSO).

With a decay time constant $\tau_s$ on the order of 40 ns, LSO, due to its exceptional scintillation yield (on the order of 30000 scintillation photons per MeV of energy deposited), enables temporal resolutions of 1 to 3 nanoseconds to be reached.

After a detection, the detector is unable to measure a second detection during a short time span known as dead time. In this instance, the LSO crystals present a short dead time (on the order of 100 ns corresponding to two or three times the decay time constant $\tau_s$), which enables the frequency of detection required by the PET machines (on the order of several KHz per $cm^2$) to be effectively monitored.

However, LSO type crystal-based inorganic scintillators present certain difficulties, particularly in the low photoelectric ratio—today 30%—that results in a 70% loss of photons received by the Compton effect.

In addition, the energy resolution dominated by the crystal scintillation yield remains insufficient, on the order of 15% at 511 keV.

Also, the localization of interactions is directly linked to the size of the crystal used. Crystals with a lateral dimension on the order of the cm are generally used; using smaller crystals involves carrying out a fractionation of crystal deposits, leading to significant cost overruns.

PET detectors based on the use of a semiconductor, such as CdTe, are also known. However, such detectors present less interesting characteristics than those of crystal detectors, particularly LSO detectors. Thus, CdTe detectors require an active thickness of 5 cm to convert 95% of photons and present a very low and rather prohibitive photoelectric ratio, on the order of 15%.

PET detectors based on the use of liquid xenon are also known; such detectors also present less interesting characteristics than those of crystal detectors, particularly LSO detectors.

Thus, liquid xenon detectors present a high attenuation length and require an active thickness on the order of 10 cm to convert 95% of photons with a probability of photoelectric conversion on the order of 21%; In addition, these detectors require the use of a complex cryogenic system with liquid purification systems that are difficult to implement.

Lastly, it should be noted that, in all cases, scintillators do not localize or poorly localize the interaction point of the gamma photon in three dimensions, but only in two. Therefore, the interaction depth remains inaccessible, which currently leads to, by default, considering it identical for all events (in the front of the detector). It is this absence of information that is at the origin of degradation of radial spatial resolution when moved from the center of the tomograph. The error is limited by using small and dense crystals in order to limit their active surface and thickness while conserving a reasonable detection effectiveness; However, the cost of such detectors remains high (crystal deposit fractionation) and the active thickness to effectively convert the photons remains a technological limit below which one cannot go.

In this context, the object of the present invention is to resolve the previously mentioned disadvantages by proposing a high-energy photon detector particularly offering a photoelectric effectiveness that is considerably improved with relation to existing detectors, a satisfactory energy resolution of less than 10%, a time resolution on the order of a few nanoseconds and 3-dimensional positioning of interactions with good resolution while enabling a simple implementation, particularly in a hospital setting.

For this purpose, the invention proposes a high-energy photon detector comprising:
  photodetector means;
  a detection medium intended to absorb a high-energy photon by generating ionization electrons and scintillation photons along a luminous phenomenon, detected by said photodetector means;
Said detector being characterized in that said detection medium is formed by molecules presenting a heavy atom with an atomic number equal to or greater than 72, such that, this detection medium is liquid under the operating conditions of the detector, said detector comprising:
  means for drifting the ionization electrons generated by the absorbed photon;
  means that collect charges to determine the time for drifting said electrons to said charge-collecting means on the basis of a triggering time corresponding to the detection of the luminous phenomenon by said photodetection means.

The present invention results from the surprising observation, described in detail subsequently, that a liquid medium, comprising atoms of a high atomic number, presents remarkable characteristics for detecting photons.

The invention advantageously uses the fact that the photoelectric ratio is much better (on the order of 57%) compared to known crystals (or other materials such as CdTe or liquid xenon).

It should also be noted that the energy resolution is more precise (less than 10%) than for LSO, considered to be a reference crystal.

Scintillation is understood to refer to any process for producing light generated by electrons resulting from the conversion of high-energy photons.

Thanks to the structure of such a detector, it is possible to measure the interaction position (i.e., generation of the scintillation photon) in 3D since the charge-collecting means (typically a Frisch grid placed before a pixelated charge collecting plane) gives indications on two dimensions corresponding to its surface area while, according to the drift time required by the ionization electrons to reach the collection means from the detection of scintillation by the photodetector means (typically a photomultiplier or APD), the position of the interaction in the thickness of the detector may be determined.

In addition, the use of a liquid detection medium, preferably of low polarity or apolar, enables, on the one hand, the displacement of the electron over relatively large distances—thereby improving the resolution of the detection to be observed—and, on the other hand, scintillation decay times on the order of a nanosecond to be obtained. Therefore, the detector according to the invention uses the following to operate:

- a detection medium (liquid under the conditions of use) comprising heavy atoms, typically of an atomic number equal to or greater than 72, whose mass fraction within the molecule is preferably high (advantageously equal to or greater than 20% and even more advantageously greater than 50%). Atoms of an atomic number equal to or greater than 72 are, for example, present within organic molecules, in the form of complexes or aggregates. This non-radioactive detection medium will enable ionization electron drift. It will advantageously be clear and scintillating, even slightly. It may be made scintillating via doping by a scintillating additive in a low mass proportion. This detection medium will preferably be apolar (or slightly polar) and aprotic to enable a more effective drift of electrons;
- photodetector means that participate in obtaining a good time resolution and three-dimensional reconstruction of the interaction position;
- charge-collecting means enabling the energy deposited in the detector and the position of the interactions in two dimensions to be measured.

The detector according to the invention may also present one or more of the characteristics below, considered individually or according to all technically possible combinations:

- said detection medium is apolar;
- said detection medium is aprotic;
- the heavy atom (such as an atom of W, Hg, Bi, Pb or Au) represents a predominant content of the molecule;
- the molecule is formed by a metal atom bound to alkyl type ligands;
- the molecule is trimethyl-bismuth, or $(CH_3)_3Bi$;
- the detection medium comprises a scintillating additive; this additive may be formed by molecules with the same properties as the main detection liquid in order to enable drift of charges;
- said scintillating additive is an alkane;
- said photodetector means are formed by one of the following devices:
- a photomultiplier;
- an avalanche photodiode;
- an MMPC or multi-pixel photon counter;
- said charge-collecting means comprise a Frisch grid;
- said charge-collecting means comprise a plane equipped with a plurality of pixels able to localize the drift electron in said plane.

Another object of the present invention is a positron emission tomography device comprising at least one detector according to the invention.

Other characteristics and advantages of the invention will clearly emerge from the description given below, for indicative and in no way limiting purposes, with reference to the attached figures in which:

FIG. 1, already described, schematically represents the implementation of a PET according to the prior art, FIG. 2, already partially described, represents the physical parameters of different materials that may be used in a PET detector, and FIG. 3 schematically and partially represents a detector in conformance with the invention.

With reference to FIG. 3, a detector 400 in conformance with the invention comprising an enclosure 411 forming an ionization chamber filled with a high-energy photon 403 detector medium 402 or detection medium is partially illustrated.

This detection medium 402 is formed by a liquid, preferably apolar (i.e., having a permanent dipole moment of zero), aprotic (i.e., lacking hydrogen atoms capable of forming hydrogen bonds) and advantageously electronically stable, i.e., the orbitals are full.

It is preferable that this liquid is predominantly formed by molecules comprising at least one atom of an atomic number greater than 72, typically a metal atom such as tungsten (W, Z=74), gold (Au, Z=79), mercury (Hg, Z=80), lead (Pb, Z=82) or preferentially Bismuth (Z=83).

In this embodiment, this atom is therefore Bismuth, which is bound at three methyl ligands to form a molecule Bi $(CH3)_3$, also represented as TMBi (trimethyl-bismuth), which is liquid at the usual customary temperatures of use (i.e. from $-40°$ C. to $60°$ C.) and accessible on the market at an industrializable price. The detection medium 402 used must be liquid under the detector 400 operation conditions (in other words, a medium may be envisioned in another phase, solid for example, outside of the detector operation conditions).

The liquid used fills all of the enclosure 411 and must be as pure as possible (i.e., oxygen equivalent contamination on the order of 0.1 ppb).

It should be noted that TMBi presents, in a pure liquid medium, a low density (2, 3) which leads to a more limited number (85%) of arrested photons with regard to the corresponding 95% for crystals (FIG. 3) such as LSO.

However, it appears that the photoelectric ratio (i.e., the ratio of the photoelectric cross section over the total cross section) is much better (on the order of 57%, FIG. 3) compared to known crystals (or other materials such as CdTe or liquid xenon).

It should be noted that the energy resolution is more precise (less than 10%) than for LSO, considered to be a reference crystal.

In addition, TMBi presents a short luminous scintillation decay time constant $\tau_s$ (on the order of a nanosecond) reducing the coincidence time window, and therefore rejecting a significant number of random coincidences.

TMBi, and more generally the detection medium 402 as defined, also presents the advantage of forming a liquid in which the charge drift will enable localization of interactions in the charge collection plane over a distance on the order of 150 microns.

Thanks to such characteristics, this medium presents particularly remarkable properties for detecting photons. In fact, the apolar, aprotic and electronically stable properties of the liquid allows it to have a behavior close to the behavior of a liquid rare gas, which enables charge drift and generates an ionization signal combined with a particularly reduced scintillation decay time (see FIG. 2: 4 ns for xenon).

To do this, in addition to the absorbent material used, detector 400 according to the invention is also differentiated from existing detectors in that it does not use scintillation to quantify the energy deposited in the detector or for directly determining the localization of the interaction, but to time an interaction (as we will explain in the rest of the description) and then, if necessary, to reconstruct the interaction position in the thickness of the detector.

Therefore the detection medium 402 of the ionization chamber 411 is between two plates that face one another:
- a first photodetecting plate 404 (this plate 404 uses, for example, photomultipliers or avalanche photodiodes APD, or MMPC);
- a second plate 406 of the Frisch grid type before a pixelated electric circuit (pixels 410 typically have a size on the order of the mm defining the spatial resolution relative to the interaction localization).

Important parameters enabling the photodetection means of the first plate 404 are: quantum efficiency, gain and pulse rise time. Photomultipliers are excellent in terms of gain and rise time, but are bulky and often not very effective. APDs are now preferentially used to detect scintillation photons. The AdvancedPhotonixn™ company sells APDs with very interesting results, for example the APD with the following reference: SD630-70-74-500.

Supply means enable a potential difference (here −10 kV-0 kV) to be applied between the two plates 404 and 406 so as to create an electric field inside the ionization chamber 411. Said electric field is substantially perpendicular to plates 404 and 406.

The operating principle of detector 400 according to the invention is then the following.

The detection medium 402 receives gamma photons from positron annihilation and converts the energy of the gamma photons 403 into light 408 (scintillation photons) and into charges (free ion-electron pairs, designated ionization), essentially by the photoelectric effect.

The first photodetecting plate 404 will then detect the scintillation photons 408 to "signal" an interaction in detector 400 (a few nanoseconds after the interaction). The first plate 404 thus enables the interaction to be timed (determination of a trigger time).

The ionization electrons 405 released by ionizing radiation will drift under the effect of the electric field to plate 406 where they are collected and quantified.

Therefore, the electric charges (ionization electrons), formed after absorption of photons 403 by the detection medium 402, drift with a duration proportional to their distance D with regard to the pixelated circuit.

The collection of ionization electrons on a particular pixel 410 enables the interaction to be localized in two dimensions (i.e., in the plane z-x that is the plane of plates 404 and 406).

For the charge collector means formed by the second plate 406, the Frisch grid is particularly useful when one wants good energy resolution by measuring the collected charges. The charge collection plane, placed behind the Frisch grid, may be finely pixelated. One may have recourse to ASIC technologies if one wishes to read a densely pixelated charge collection plane.

In addition, as mentioned above, detection of scintillation by the photodetecting plate 404 starts the drift time measurement of ionization electrons 405 in the ionizing chamber 411. Consequently, knowing the start time and the drift time of the ionization electrons, the distance covered D parallel to the drift electric field may be deduced, i.e., in the thickness (i.e., along the y axis) of detector 400. This distance therefore localizes the interaction in the thickness of detector 400.

Therefore, the detector enables a 3D measurement of the interaction position (i.e., generation of scintillation photons) since the grid 406 of pixels 410 gives indications on two dimensions corresponding to its surface area (axes x and z of the mark represented) while, as a function of the drift time required by the electron in a known field, the distance D, and therefore the interaction position on the y axis represented, may be easily determined.

By combining the previously described medium and structure, theoretical evaluations determine a photoelectric effectiveness of 57% and an energy resolution of 10%, with a time resolution of a few ns and interaction positioning with a precision of one millimeter in 3D.

It will be noted that the fact that the scintillation yield is much lower in a material such as TMBi matters little here (the presence of scintillation only matters) inasmuch as scintillation only serves to determine the initial electron drift time along the electric field axis.

It will also be noted that the 2D resolution is given by the pixelation resolution (i.e., size and spacing of pixels 410 on the charge collection plate placed behind the Frisch grid 406).

Therefore, a detector in conformance with the invention presents an effectiveness that is greater than existing detectors.

The present invention is capable of many variations, particularly regarding the nature and number of heavy metals implemented in the liquid even if bismuth proves to be a particularly effective candidate.

In addition, the structure of organic molecules comprising heavy atoms may vary: Typically, it will correspond to organic ligands associated with one or more heavy atoms. Ligands generally correspond to alkyl or cycloalkyl chains. Advantageously, the ligands will not comprise atoms likely to induce polarization of the molecule.

In addition, these heavy atoms may be used in the form of mononuclear or polynuclear complexes or submicrometric sized particles.

It is also clear that a detector in conformance with the invention may be implemented for different applications, particularly with regard to a large sized organism (human body PET), medium sized organism (PET of a part of the human body) or small sized organism ("small animal" PET), and in a particularly interesting manner, in the context of preclinical and pharmacological studies to perform simultaneous imaging of several small animals.

In fact, small animal PET represents 90% of PET devices; Currently, small animal PET is implemented on an individual by individual basis while a detector in conformance with the invention would enable PET to be performed on several individuals simultaneously by advantageously using three dimensional localization, mitigating the problems connected with the absence of information at the origin of radial spatial resolution degradation when one moves from the center of the tomograph.

The invention claimed is:

1. A high-energy photon detector comprising:
    a photodetector;
    a detection medium configured to absorb a high-energy photon and generate ionization electrons and photons according to a luminous phenomenon, detected by said photodetector,
wherein said detection medium is formed by molecules presenting a heavy atom with an atomic number equal to or greater than 72, such that the detection medium is liquid under operating conditions of the detector, wherein a mass fraction of the heavy atom within each of the molecules is greater than 50%,
- a drift system to drift the ionization electrons generated by the absorbed photon;
- a collector configured to collect charges to determine the drift time of said electrons to said collector on a basis of a triggering time corresponding to the detection of the luminous phenomenon by said photodetector.

2. The photon detector according to claim 1, wherein said detection medium is apolar.

3. The photon detector according to claim 1 wherein said detection medium is aprotic.

4. The photon detector according to claim 1, wherein the molecule is formed by a metal atom bound to alkyl type ligands.

5. The detector according to claim 4, wherein the molecule is trimethyl-bismuth (($CH_3$)$_3$Bi).

6. The detector according to claim 1, wherein the detection medium comprises a scintillating additive.

7. The photon detector according to claim 6, wherein said scintillating additive is an alkane.

8. The photon detector according to claim 1, wherein said photodetector is formed by one of the following devices:
- a photomultiplier;
- an avalanche photodiode;
- a multi-pixel photon counter.

9. The photon detector according to claim 1, wherein said charge collector comprises a Frisch grid.

10. The photon detector according to claim 1, wherein said charge collector comprises a plane equipped with a plurality of pixels able to localize the drift electron in said plane.

11. A positron emission tomography device comprising a detector according to claim 1.

12. The photon detector according to claim 1, wherein the heavy atom is W, Hg, Bi, Pb, or Au.

13. The photon detector according to claim 1, wherein the drift system includes plates to generate an electric field, and wherein, in use, the ionization electrons drift toward one of the plates under the effect of the electric field.

* * * * *